United States Patent [19]

Hatano et al.

[11] Patent Number: 4,698,801

[45] Date of Patent: Oct. 6, 1987

[54] DIGITAL EXCHANGE SYSTEM

[75] Inventors: Takashi Hatano, Machida; Takashi Nara, Yokohama; Yutaka Kawato, Tokyo; Sumie Okada, Yokohama, all of Japan

[73] Assignee: Fujitsu Limited, Kawasaki, Japan

[21] Appl. No.: 686,675

[22] Filed: Dec. 27, 1984

[30] Foreign Application Priority Data

Dec. 29, 1983 [JP] Japan .................................. 58-247703

[51] Int. Cl.⁴ ............................................. H04Q 11/04
[52] U.S. Cl. ......................................... 370/58; 370/84
[58] Field of Search ................... 370/58, 84, 110.1, 79, 370/60, 94

[56] References Cited

U.S. PATENT DOCUMENTS 4,538,286  8/1985  McNesby et al. ..................... 370/84
4,550,399  10/1985  Caron ..................................... 370/84

OTHER PUBLICATIONS

"Technical Aspects in the Implementation of a Public Switched Network for Data" International Switching Symposium, Vol. 2, pp. 515–522 Mossotto et al.
"Evaluation of Different Data Communication Media Within an Integrated Telecommunication System", Sep. 1978, pp. 557–563 Parodi et al.
"ISDN Capabilities in a Digital Local Exchange" Sep. 1982, Proceedings of the 6th International Conference on Computer Communication, pp. 38–41.
"Digital Subscriber Lines to PRX/D" International Symposium on Subscriber Loops and Services, Sep. 1982, pp. 62–64.
"Customer Access to the ISDN Facilities" International Switching Symposium, Sep. 1981, Vol. 4, pp. 4–7, Montemurro et al.
"An Implementation Scheme for ISDN Multi-Service Subscriber Access", Globecom'82 IEEE Global Telecommunications Conference, Dec. 1982, Vol. 3, p. 1212.

Primary Examiner—Douglas W. Olms
Attorney, Agent, or Firm—Staas & Halsey

[57] ABSTRACT

A digital exchange system including exchange terminals, a digital network, and a bit rate conversion unit located therebetween. The bit rate conversion unit operates to match low bit-rate channel signals with high bit-rate channel signals acceptable by the digital network, by multiplexing a plurality of the outgoing low bit-rate channel signals. The bit-rate conversion unit operates, on the other hand, to demultiplex the incoming multiplexed low bit-rate channel signals.

13 Claims, 9 Drawing Figures

DIGITAL EXCHANGE SYSTEM

BACKGROUND OF THE INVENTION

1. Field of the Invention

The present invention relates to a digital exchange system, more particularly, to a method for dealing with two channel signals having different bit rates.

Information is rapidly becoming a marketable commodity around the world. Japan is now testing a highly advanced "information network service" (INS) system. Other countries are trying out the widely known "integrated service data network" (ISDN) on a commercial basis. The digital exchange system according to the present invention is applicable to both INS and ISDN. The following explanation primarily refers to ISDN.

2. Description of the Related Art

In an ISDN, special transmission lines are set aside to connect subscribers and a plurality of digital exchange offices. Each transmission line includes two identical "B" channels and one "D" channel, i.e., signals pass through 2B+D channels. According to CCITT protocol, the B channels transmit channel signals at a bit rate of 64 kbit/s. Usually, the B channels are used for transmission of 8 bit voice information signal obtained with 8 kHz sampling.

In the same protocol, the D channel transmits channel signals at a bit rate of 16 kbit/s. Usually, the D channel is used for transmission of control signals.

B and D channel signals from subscribers are transferred to a digital exchange office where the required switching operations are performed. The switching operations are carried out at a bit rate of 64 kbit/s in view of the maximum 64 kbit/s bit rate of the B channel signals. Accordingly, no adjustment in bit rate is needed at the digital exchange office, for the B channel signals. Adjustment for the D channel signals, however, is inevitable, due to the low 16 kbit/s bit rate.

To match the bit rates of the B channel signals and D channel signals, the inventors have previously attempted to reform the bit stream of the D channel signals to adjust the bit rate of the D channel signals to substantially that of the B channel signals. For example, they have reformed a digital D channel signal having a logic sequence of "10" at 16 kbit/s to one having a logic sequence of "1111 0000" at 64 kbit/s. In other words, they changed the original D channel signal "10" to match the B channel signal without changing the inherent logic information ("10") by increasing the original bit rate for the D channel signal four $$\left( \frac{64 \text{ kbit/s}}{16 \text{ kbit/s}} \right)$$

times.

This is, however, clearly disadvantageous in terms of the transmission efficiency of the digital exchange system because the reformed D channel signal, e.g., "11110000" comprises only two useful bits "1" and "0", and three useless "1" bits and three useless "0" bits.

SUMMARY OF THE INVENTION

Accordingly, an object of the present invention is to provide a digital exchange system with improved transmission efficiency especially for low bit-rate channel signals, such as D channel signals.

The above object is attained as follows. High bit-rate channel signals of M kbit/s are communicated directly to and from a digital network in a two-way mode. Low bit-rate channel signals of N kbit/s (M and N are positive integers and M>N), are communicated to the digital network in a one-way mode through a multiplex means, and communicated from the digital network in the opposite way through a demultiplex means. The multiplex means multiplexes a number [M/N] (the symbol [ ] denotes Gauss' notation) or less, of outgoing low bit-rate channel signals, while the demultiplex a number, means demultiplexes [M/N] or less, of incoming low bit-rate channel signals.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
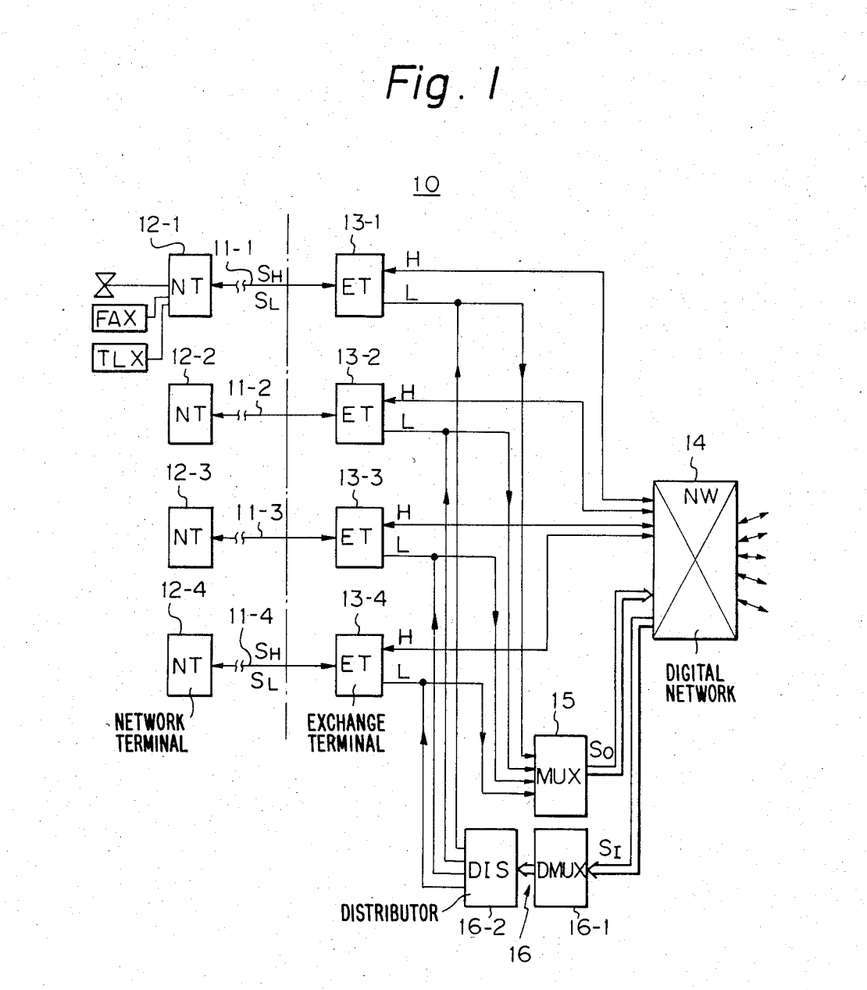
FIG. 1 illustrates a general construction of a digital exchange system according to the present invention.

FIG. 1 illustrates a general construction of a digital exchange system according to the present invention. In FIG. 1, a digital exchange system 10 is located on the right side of the vertical chain-dotted line. The left side of the line represents the subscribers' side of the network. The digital exchange system 10 is connected with each of the subscribers via individual transmission lines 11-1 through 11-4 (only four subscribers are illustrated for brevity). The transmission lines 11-1 through 11-4 connect, at one ends, to individual exchange terminals (ET) 13-1 through 13-4 and, at the other ends, with individual network terminations 12-1 through 12-4. Each of the network terminations is provided with terminal equipment, including digital telephones, facsimiles, and telexes, such as representatively illustrated for the network termination 12-1.

Communication signals with the digital exchange system occurs over the individual transmission lines 11-1 through 11-4. Each of these transmission lines transfers high bit-rate channel signals $S_H$ and low bit-rate channel signals $S_L$ by a high bit-rate channel and a low bit-channel, respectively. The high bit-rate channel and the low bit-rate channel correspond, in an ISDN, to the aforesaid B channels and D channel, respectively.

In the digital exchange system 10, the exchange terminals 13-1 through 13-4 are mounted at input/output ports and deal with the high and low bit-rate channel signals $S_H$ and $S_L$. The high bit-rate channel signals directly communicate with the digital network (NW) 14 in a full duplex mode. This is because the digital network 14 is inherently designed to perform switching operations for the high bit-rate channel signals. In other words, only a high bit-rate stream can flow across the digital network 14. Accordingly, the low bit-rate channel signals $S_L$ cannot be transmitted by the digital network 14, if the signals $S_L$ are not processed and are instead, left as low rate signals. For this, according to the present invention, particular signal processing is effected for the low bit-rate channel signals, as explained below.

As seen from FIG. 1, a multiplex means (MUX) 15 and a demultiplex means (DMUX+DIS) 16 are incorporated within the digital exchange system 10. The multiplex means 15 operates to multiplex sets of the outgoing low bit-rate channel signals (L) received from the related exchange terminals 13-1 through 13-4, and supplies the multiplexed low bit-rate channel signals to the digital network 14. The multiplexed low bit-rate channel signals are transmitted together with the high bit-rate stream, and therefore, can be efficiently accepted by the digital network 14. Conversely, the multiplexed incoming low bit-rate channel signals and the high bit-rate stream, which are output from the digital network 14 are applied to the demultiplex means 16. The demultiplex means 16 includes a demultiplexer (DMUX) 16-1 and a distributor (DIS) 16-2. The multiplexed incoming low bit-rate channel signals are supplied form a multiplex means, not shown but identical to the multiplex means 15. The demultiplexer 16-1 operates to demultiplex the high bit-rate stream into sets of low bit-rate channel signals $S_L$, each set is distributed to a corresponding exchange terminal (13) and sent toward its specified destination, i.e., the terminal equipment.

Figure 2:
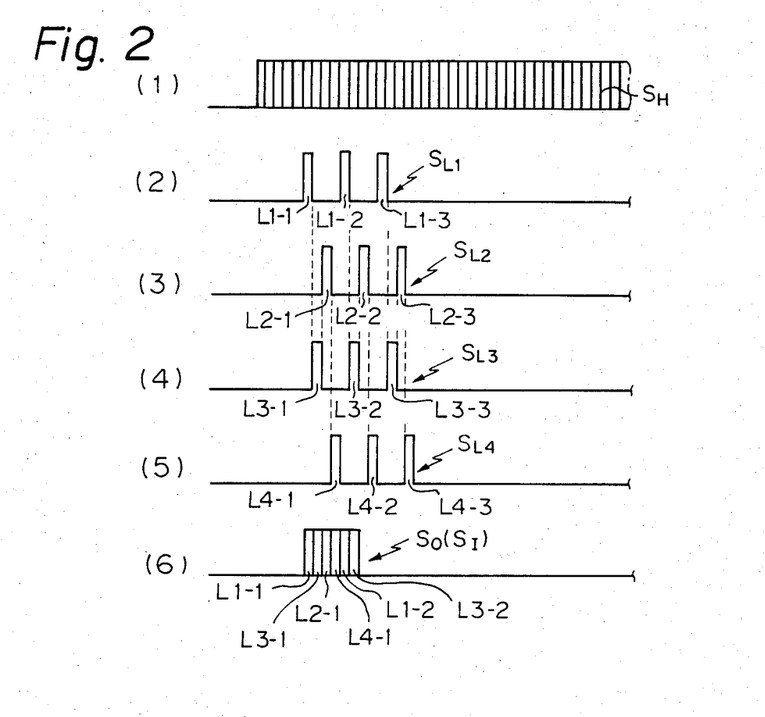
FIG. 2 depicts signal allocations which are processed by the digital exchange system of FIG. 1.
Figure 3:
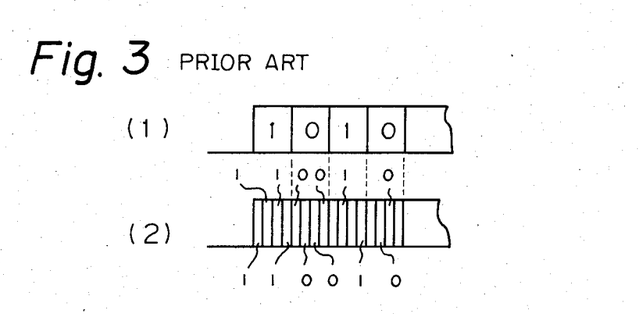
FIG. 3 depicts signal allocations used in a known method.

FIG. 2 depicts signal allocations which are processed by the digital exchange system of FIG. 1. The advantage of the signal allocations of FIG. 2, in comparison with signal allocations of FIG. 3 is explained below. FIG. 3 depicts signal allocations utilized in a known method. As previously explained with reference to the related art, according to the known method, a low bit-rate channel signal having, for example, the logic sequence "1010" (refer to row (1) of FIG. 3), is formed into a high bit-rate stream as shown in row (2) of FIG. 3 so that it can be easily accepted by the digital network 14. The high bit-rate stream comprises the logic sequence of "11110000 . . . ". The above-mentioned method is, however, has poor transmission efficiency, because the major part of the stream comprises useless signals, as mentioned previously.

Referring to FIG. 2, the high bit-rate channel signal $S_H$ is illustrated in row (1). The signal $S_H$ has a bit rate of M kbits/s (M is a positive integer). The signal $S_H$ corresponds, in an ISDN, to the B channel signal, in which M is specified to be 64. Rows (2) through (5) of FIG. 2 represent the low bit-rate channel signals $S_{L1}$, $S_{L2}$, $S_{L3}$, and $S_{L4}$ issued from the network terminations 12-1 through 12-4 and generated by the corresponding exchange terminals 13-1 through 13-4, respectively. The digital pulses forming the signal $S_{L1}$ are allocated in time series as shown by characters L1-1, L1-2, and L1-3. This is true of the remaining signals $S_{L2}$, $S_{L3}$, and $S_{L4}$ as well. Each of the signals $S_{L1}$ through $S_{L4}$ has a bit rate of N kbit/s (N is a positive integer and M>N) and corresponds in an ISDN, to the D channel signal, in which N is specified to be 16.

According to the present invention, the multiplex means 15 operates to multiplex a number, [M/N] or lower, of outgoing low bit-rate channel signals ($S_L$). If M and N are selected as 70 and 18, respectively, the multiplex number [M/N] will be a maximum of 3. This is because [70/18] is 3. In the above example, four (64/16) outgoing low bit-rate channel signals $S_{L1}$ through $S_{L4}$ are multiplexed to obtain a multiplexed outgoing low bit-rate channel signal $S_O$ as shown in row (6) of FIG. 2. The multiplexed signal $S_O$ is produced, as illustrated in FIG. 1, from the multiplex means 15 and supplied to the digital network 14. Since the signal $S_O$ is transferred at the same high bit-rate, as is the high bit-rate channel signal $S_H$, the signal $S_O$ can easily be accommodated by the digital network 14.

In a similar way, the multiplexed incoming low bit-rate channel signal $S_I$ is supplied at the same high bit-rate from the digital network 14 to the demultiplexer 16-1. In this case the signal $S_I$ has the same signal allocations as the signal $S_O$ illustrated in row (6) of FIG. 2. As shown in FIG. 1, the multiplexed digital pulses are distributed to the corresponding exchange terminals 13-1 through 13-4 by means of the distributor 16-2. The distribution is as illustrated in rows (2) through (5) of FIG. 2.

The present invention is advantageous because the high bit-rate stream does not include any useless signals, as shown in row (6) where each of the individual digital pulses corresponds to a signal, such as L1-1, L3-1, and L4-1. Contrary to the above, in the known method, the identical high bit-rate stream includes large numbers of meaningless digital pulses which are used only to create a high bit-rate stream, as shown in row (2) of FIG. 3.

Further, according to the present invention, the low bit-rate channel can includes not only control signals, but also data signals, if necessary. In ISDN, the D channel (corresponding to the low bit-rate channel) includes only such control signals. This is because the low bit-rate channel signal of the present invention can easily be accommodated, after being multiplexed, by the digital network 14. On the other hand, the high bit-rate channel transfers both voice signals and data signals, as in the B channel of the ISDN. In this case, the data signals transferred along the high bit-rate channel (B channel) can contain a large amount of high frequency information, such as television signal information. This is unlike the low frequency data signals transferred along the low bit-rate channel (D channel), for example, telex signal information.

When a mixture of control and data signals are communicated through the low bit-rate channel (D channel), it is best to deal with them using a so-called "packet" format. The packet format is created in each terminal equipment and can be set up according to the known high-level data link control (HDLC) method, employed for the X.25 protocol of CCITT. The data signal packets can be handled in a packet switching digital network (PSDN) located outside the digital exchange system 10. The control signal packets are processed in a call processor (described below) and used to control the switching of the data signals which pass through the digital network 14.

Figure 4:
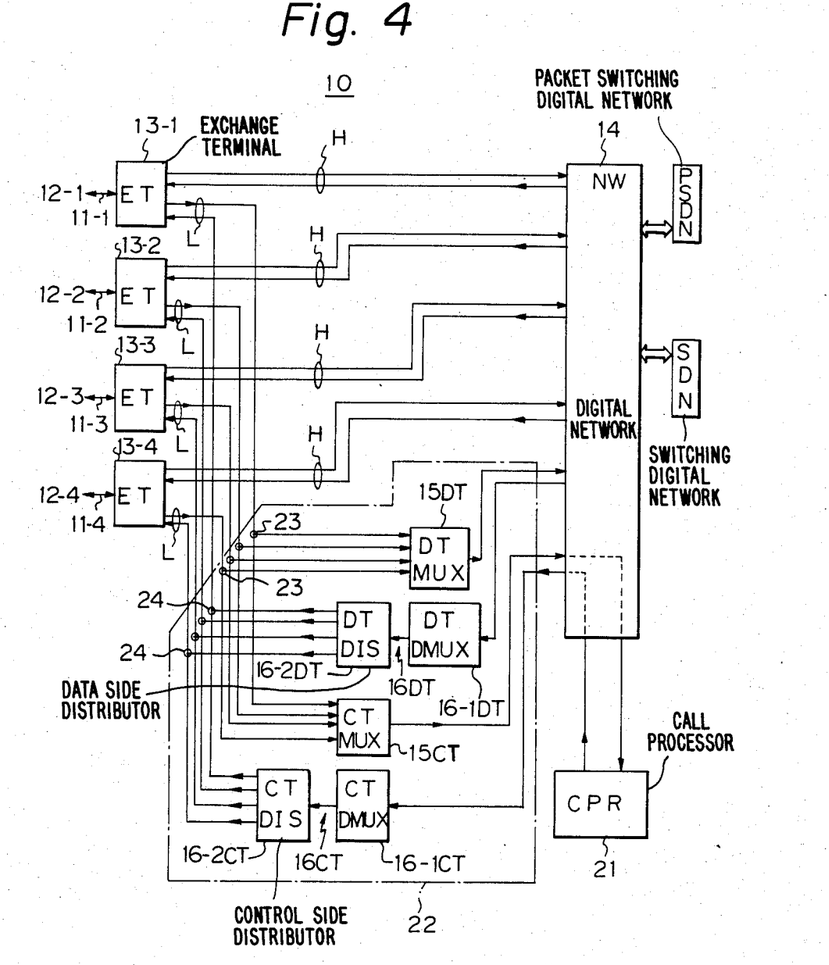
FIG. 4 shows in slightly more detail the construction of the digital exchange system of FIG. 1.

FIG. 4 shows in a slightly more detailed manner the construction of the digital exchange system of FIG. 1. In FIG. 4, the call processor is represented by CPR 21, which controls the switching of the digital network (NW) 14. The high bit-rate channel signals, in the form of packets, if necessary, and the low bit-rate channel data signals, in the form of packets, are transferred between the network 14 and the ordinary signal switching digital network (SDN) and the packet switching digital network (PSDN). The multiplexed and demultiplexed low bit-rate channel signals are processed by a processor 22.

The processor 22 embodies the present invention. That is, the processor 22 basically includes the multiplex means 15 and the demultiplex means 16 shown in FIG. 1. It is preferable to divide the multiplex means 15 and the demultiplex means 16 into a data (DT) side and control (CT) side, as shown in block 22. The data side means include the multiplex means (DT·MUX) 15DT, the demultiplexer (DT·DMUX) 16-1DT, and the distributor (DT·DIS) 16-2DT. Similarly, the control side means includes the multiplex means (CT·MUX) 15CT, the demultiplexer (CT·DMUX) 16-1CT, and the distributor (CT·DIS) 16-2CT. The data side signals and the control side signals are separated by data/control discriminators 23 when these signals are to be multiplexed. The demultiplexed data and control signals are separated by data/control discriminators 24. The discriminations can be achieved with the use of a data/control discrimination flag inserted in the packet format. It should be understood here that separation between the data side and the control side is not essential to the present invention.

The processor 22 of FIG. 4 is most preferably realized as a computer aided unit.

Figure 5:
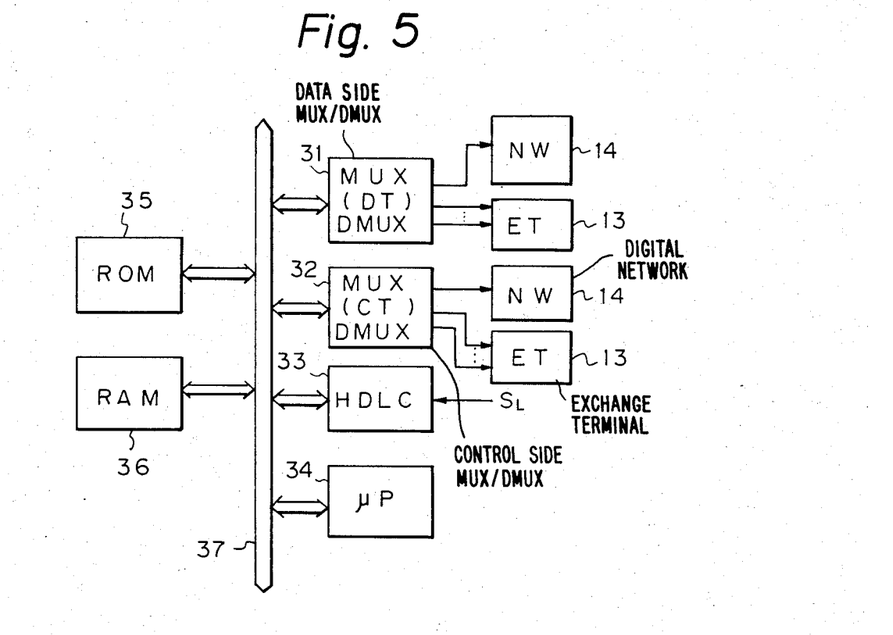
FIG. 5 is a block diagram of the multiplex/demultiplex processor shown in FIG. 4.

FIG. 5 is a block diagram of the multiplex/demultiplex processor shown in FIG. 4, fabricated as a computer aided unit. In FIG. 5, the computer aided multiplex/demultiplex processor 22 is supervised by a microprocessor (μP) 34. The microprocessor 34 operates according to control programs stored in a read-only memory (ROM) 35. All of the low bit rate channel signals $S_L$, in the form of packets, are applied to an HDLC unit 33 which is operatively connected to the lines extending between the exchange terminals (ET) 13-1 through 13-4 and the digital network 14. The frame formats of the signals are shown in FIGS. 6A and 6B.

Figure 6A:
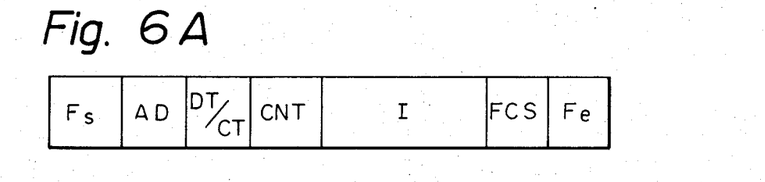
FIG. 6A shows a frame format for the outgoing low bit-rate channel signal before being multiplexed.
Figure 6B:
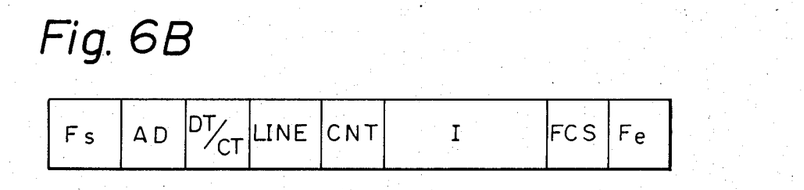
FIG. 6B, shows a frame format for the incoming low bit-rate channel signals before being demultiplexed.

FIG. 6A shows a frame format for the outgoing low bit-rate channel signal, not yet multiplexed. FIG. 6B shows a frame format of the incoming low bit-rate channel signal, not yet demultiplexed. Referring to FIGS. 6A and 6B, Fs denotes a start flag which identifies the start of the packet signal, and Fe denotes an end flag which identifies the end of the packet signal; AD denotes an address field indicating the destination of the packet; DT/CT denotes a data/control discrimination flag indicating whether the related packet includes a data signal or a control signal. The characters CNT denote a control field containing control information for the HDLC unit 33 (FIG. 5). The character I denotes an information field regarding either data or control, and the characters FCS denote a frame check sequence field used for error detection of the related packet. The characters LINE in FIG. 6B denote an identification field indicating to which one of the exchange terminals (13-1 to 13-4) the related packet should be directed. The major part of the frame format shown in FIGS. 6A and 6B is not new. The DT/CT flag and the identification field LINE are relevant to the present invention.

Returning to FIG. 5, various sets of information contained in the frame format (FIGS. 6A and 6B) are stored once in a random-access memory (RAM) 36 and then supplied to both a data side (DT) input/output interface 31 and a control side (CT) input/output interface 32. Each of the interfaces 31 and 32 is functionally divided into a multiplex part (MUX) and a demultiplex part (DMUX).

Figure 7A:
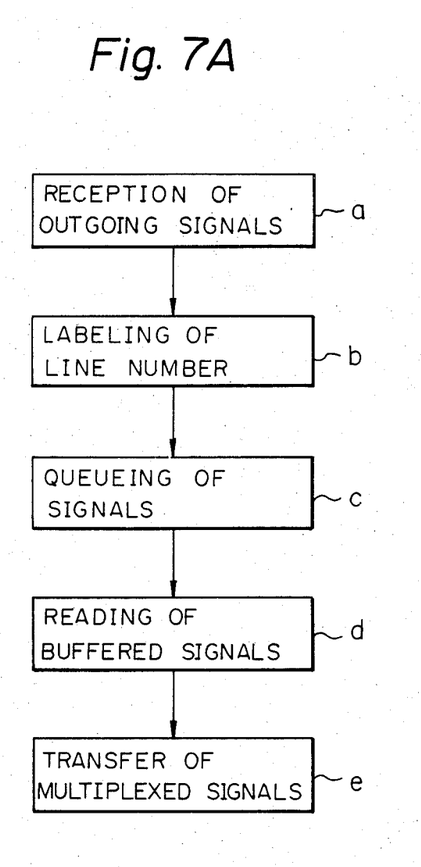
FIG. 7A is a general flow chart for the multiplexing operation carried out by the microprocessor of FIG. 5.
Figure 7B:
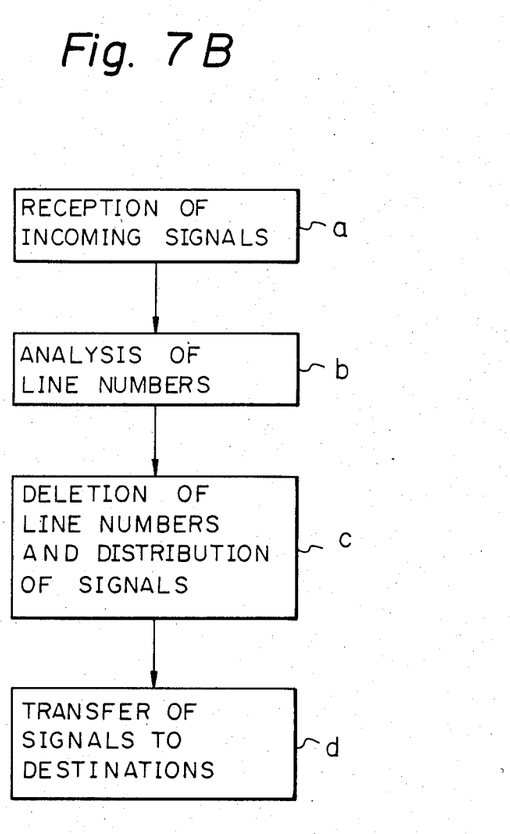
FIG. 7B is a general flow chart for the demultiplexing operation carried out by the microprocessor of FIG. 5.

FIG. 7A is a general flow chart for the multiplexing operation carried out by the microprocessor of FIG. 5. FIG. 7B is a general flow chart for the demultiplexing operation carried out by the microprocessor of FIG. 5. In FIG. 7A, the outgoing low bit-rate channel signals are received, at one time, by the HDLC unit 33 (step a). Here, each of the received signals has the frame format of FIG. 6A. Then, an individual line number is given to each of the received signals at the identification field LINE (step b). Thus, the frame format of the packet is made identical to that of FIG. 6B. The individual line number indicates the corresponding number of the exchange terminals 13-1 through 13-4, such as 1, 2, 3, and 4, from which respective outgoing signals are issued. The packet signals are sequentially loaded in a buffer queue formed in, for example, a part of the RAM 36 (step c). A plurality of the thus buffered signals are read from the buffer queue to set up multiplexed signals and are sent from the interface 31 or 32 (step d). The multiplexed low bit-rate signals are transferred to the digital network 14 (step e).

Referring to FIG. 7B, the incoming low bit-rate channel signals, not yet demultiplexed, are received, at one time, by the HDLC unit 33 (step a). Here, each of the received signals has the frame format of FIG. 6B. Then, the identification fields, indicative of the destination lines, of each incoming signal packet are analyzed (step b). Once the corresponding lines for each packet are detected, the line numbers are no longer needed. Therefore, the identification fields are deleted to form the frame format as shown in FIG. 6A. At the same time, the packets are distributed to individual lines via a demultiplex part in the interface 31 or 32. The distributed signals are then transferred to individual destinations.

The above-mentioned outgoing low bit-rate channel signal, together with the outgoing high bit-rate channel signal, are transferred via an individual transmission line, for example, 11-1 in FIG. 1. Also, the above-mentioned incoming low bit-rate channel signal, together with the incoming high bit-rate channel signal, is transferred via the same transmission line 11-1. In this case, the transmission line 11-1 is usually made of conventional paired lines. This is also true of other transmission lines. Accordingly, so-called full-duplex communication must be established via the paired lines in a two-way mode for both the outgoing and incoming signals, transferred thereon. Full-duplex communication is achieved by means of the network termination (shown by 12-1 through 12-4 in FIG. 1) and the corresponding exchange terminals (shown by 13-1 through 13-4 in FIGS. 1 and 4). Full duplex communication can be performed under the known echo-cancellation method or known time compression multiplex method.

According to the echo-cancellation method, both incoming and outgoing channel signals are given to the transmission line 11-1 simultaneously. The network termination 12-1 operates to extract and receive the incoming channel signal only. This extraction is possible due to the fact that the outgoing channel signal is known at the network termination, since it is generated from the network termination side. Similarly, the exchange terminal 13-1 operates to extract and receive the outgoing channel signal only, since the incoming channel signal is known at the exchange terminal 13-1 as it is supplied from the exchange terminal side.

According to the time compression multiplex method, incoming time slots and outgoing time slots are alternately allocated for the transmission line. Therefore, the outgoing channel signals are transferred, from the network termination to the exchange terminal, every time the outgoing time slot exists, while the incoming channel signals are transferred, from the exchange terminal to the network termination, every time the incoming time slot exists. Due to this alternate transfer, the method is also called, the "ping-pong" transmission method.

As explained above in detail, the digital exchange system according to the present invention enables a greatly increased transmission efficiency for low bit-rate channel signals, because the digital network 14 does not receive any useless signals or dummy signals used only to match the speed of the high bit-rate channel signals, i.e., with the present invention all signals are meaningful.

What is claimed is:

1. A digital exchange system comprising:
    transmmission lines;
    network terminations;
    a plurality of subscriber terminal equipment;
    a plurality of exchange terminals connected, via respective ones of said transmission lines and said network terminations, with subscriber terminal equipment;
    a digital network means for switching between respective ones of said subscriber equipment and for switching only first channel signals having high bit rate; and
    a bit-rate conversion means, operatively connected between said digital network means and said exchange terminals, for matching the bit rate of second channel signals comprising packets and having a low bit rate with said high bit-rate channel signals, both of said first channel signals and said second channel signals being transferred, respectively, in a high bit-rate channel and a low bit-rate channel over each of said transmission lines,
    said first channel signals comprising M (M is a positive integer) kbit/s signals, communciated directly to and from said digital network,
    said second channel signals comprising N (N is a positive integer and M>N) kbit/s packet signals, communciated to and from said digital network by way of said bit-rate conversion means, the bit rate conversion including mulitplex means and demultiplex means,
    said multiplex means multiplexes up to [M/N] first channel signals to obtain multiplxed low bit-rate channel signals for transmission to said digital network,
    said demultiplex means demultiplexs up to [M/N] multiplexed first channel signals and distributing the demultiplexed signals to corresponding exchange terminals.

2. A system as set forth in claim 1, wherein said demultiplex means comprises:
    demultiplexer means, operatively connected to receive the multiplexed low bit-rate channel signals, for demultiplexing these signals into individual first channel signals; and
    distributor means, operatively connected to receive said individual first channel signals, for distributing these signals to respective ones of said exchange terminals.

3. A system as set forth in claim 2, wherein each of said second channel signals comprises a packet control signal for controlling said digital network means so that the related high bit-rate channel signals are switched to the appropriate one of said subscriber equipment.

4. A system as set forth in claim 3, wherein each of said second channel signals further comprises a data signal to be switched in said digital network means, in accordance with said control signal.

5. A system as set forth in claim 4 operatively connectable to a packet switching digital network, wherein each of said data signals comprises a packet, the data signal packets being communicated, via said digital network, to and from the packet switching digital network.

6. A system as set forth in claim 5, whererin each of said signal packets comprises a frame format including therein a data/control discrimination flag indicating that the associated packet includes one of data information and control information.

7. A system as set forth in claim 6, wherein each of said signal packets comprises said frame format and includes an identification field identifying to which one of said lines the related signal packet is to be distributed.

8. A system as set forth in claim 7, wherein each of said formats further includes a start flag indicative of the the head of the signal packet, a control field including packet control information, a frame check sequence field used for error detection of the signal packet, and an end flag indicative of the end of the signal packet.

9. A system as set forth in claim 8, wherein said bit rate conversion means comprises:
    a multiplex/demultiplex processor including a microprocessor;
    read-only memory (ROM) means, operatively connected to said microprocessor, for storing predetermined control programs to be supplied to the microprocessor;
    a high-level data link control means, operatively connected to said microprocessor, for controlling subject to X.25 protocol of CCITT, said signal packets being transferred between said digital network and said exchange terminals;
    random-access memory (RAM) means, operatively connected to said microprocessor, for storing said data signals and said control signals associated with said signal packets;
    first input/output interface means, operatively connected to said microprocessor for exchanging said multiplexed and demultiplexed control signal packets stored in the RAM, between said digital network and a corresponding one of said exchange terminals; and
    second input/output interface means, operatively connected to said microprocessor, for exchanging said multiplexed and demultiplexed data signal packets stored in the RAM, between said digital network and the corresponding one of said exchange terminals.

10. A system as set forth in claim 9, wherein said subscriber terminal equipment comprises one or more units selected from, at least, a digital telephone unit, a facsimile unit, and a telex unit.

11. A system as set forth in claim 10, wherein said control signal and data signal exchanges occur over each of said transmission lines, between each of said network terminations and corresponding ones of said exchange terminals via echo-cancellation full duplex.

12. A system as set forth in claim 10, wherein said control signal and said data signal exchanges occur over each of said transmission lines, between each of said network terminations and corresponding ones of said exchange terminals via time compression multiplex full duplex.

13. A system as set forth in claim 10, wherein said digital exchange system comprises an integrated service data network (ISDN), and in which said integers M and N are selected as 64 and 16, respectively.

* * * * *

UNITED STATES PATENT AND TRADEMARK OFFICE
CERTIFICATE OF CORRECTION

PATENT NO. : 4,698,801

DATED : October 6, 1987

INVENTOR(S) : Takashi HATANO et al.

It is certified that error appears in the above-identified patent and that said Letters Patent is hereby corrected as shown below:

Col. 2, line 11, after "demultiplexes" insert --a number,--.

Col. 3, line 33, change "form" to --from--.

Signed and Sealed this

Thirty-first Day of May, 1988

Attest:

DONALD J. QUIGG

Attesting Officer

Commissioner of Patents and Trademarks